Oct. 23, 1934.　　E. F. W. ALEXANDERSON　　1,978,183
SOUND REPRODUCING APPARATUS
Filed Jan. 27, 1934
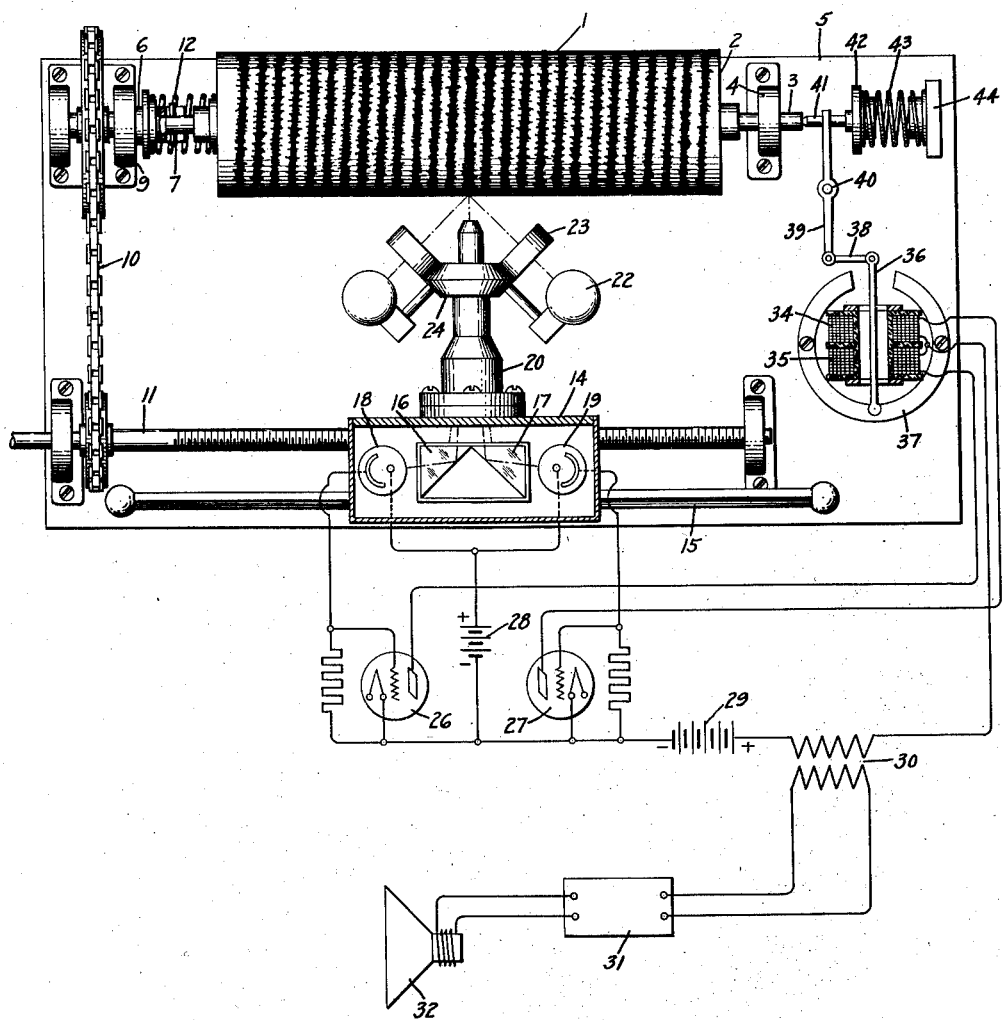
Inventor:
Ernst F. W. Alexanderson,
by　Harry E. Dunham
His Attorney.

Patented Oct. 23, 1934

1,978,183

UNITED STATES PATENT OFFICE 1,978,183

SOUND REPRODUCING APPARATUS

Ernst F. W. Alexanderson, Schenectady, N. Y., assignor to General Electric Company, a corporation of New York Application January 27, 1934, Serial No. 708,566

6 Claims. (Cl. 179—100.3)

My invention relates to apparatus for reproducing sound from a sound record, and particularly to that type of reproducing apparatus which employs optical and photo-electric means for reading the record. One object of my invention is the provision of improved means for automatically preserving the proper alinement of the optical means and the sound record. Another object is to provide a construction of such apparatus whereby the same photo-electric means functions both in the reproduction of the recorded sound and in effecting the above-mentioned alinement.

My invention will be better understood from the following description taken in connection with the accompanying drawing, and its scope will be pointed out in the appended claims.

In the single figure of the drawing which is a combined circuit diagram and plan view of a construction embodying my invention, I have chosen to illustrate my invention as being constructed to employ a sound record member 1 in the form of a cylinder supported on the drum 2 upon which member the record, which may be formed photographically, mechanically or ink printed, or otherwise produced, extends in a spiral track extending from one end of the cylinder to the other. If desired the sound record member may be in the form of a long strip which passes over the drum and which may have one or more sound record tracks thereon. The sound record may be formed or printed upon a suitable cylinder, as illustrated, or may comprise a sheet, for example of paper, which is wrapped around the drum 2. The drum shaft 3 is supported at one end in the bearing 4 secured to the base 5 and at the other end is connected with the countershaft 6 through the key connection 7 which permits of relative longitudinal movement between those shafts. Countershaft 6 is supported on the base in the bearings 9 which shaft is connected by the chain drive 10 with the screw drive shaft 11 to the end of which any suitable means, such as a motor, may be attached for driving the apparatus. Between the drum shaft and the countershaft is the coil spring 12 arranged to urge the drum toward the right as shown for purposes to be described hereinafter.

Opposite the drum 2 is the casing 14 which is arranged to slide on the guide 15 and which is provided with a suitable nut, not shown, to engage the threads on screw shaft 11, whereby as this shaft turns the casing and parts attached thereto move longitudinally of the drum at the proper speed. Within the casing 14 are the two oppositely arranged prisms 16 and 17 and the two photoelectric tubes 18 and 19 each positioned to receive light from the record reflected by one of the prisms. Secured to the casing 14 is the optical member 20 which is provided with a narrow light slit adjacent the prisms and a microscope objective at the opposite end thereof whereby light received from a narrow transverse portion of the sound record is reflected partly toward one photo tube and partly toward the other photo tube. When the optical member is in proper position light controlled by one side of the sound record will effect one photo tube and light controlled by the opposite side of the sound record will control the other photo tube. With a sound record of the type disclosed wherein the opposite sides of the record are identical, it will be observed that the two photo tubes will receive identical light impulses. For properly illuminating the sound record at the point at which the record is to be read off by the apparatus, I have provided the two illuminating lamps 22 whose light is concentrated by suitable condensing lenses 23, the lamps and the lenses being supported by the bracket 24 on the optical member 20.

The two photo tubes 18 and 19 are connected respectively to the electron discharge amplifiers 26 and 27, a common battery 28 being employed in the photo tube grid circuits and a common battery 29 being employed in the anode-cathode circuits of the amplifier. In circuit with battery 29 I have shown the primary of the transformer 30, the secondary of which is shown connecting through the amplifier 31 with the loud speaker 32.

For the purpose of regulating the relative position of the sound record and the optical member 20 transversely of the sound record whereby the sound record should be maintained at all times in proper alinement with the optical member, I have provided the regulating means which will now be described. Connected between the anodes of the two amplifiers 26 and 27 are the two oppositely wound coils 34 and 35, these coils being shown with a common connection leading to the transformer 30 and battery 29. Extending through the coils is the armature 36 which is shown pivoted at its lower end in the field magnet 37 and which connects at its upper end through the link 38 with the lever 39 pivoted at 40. At the upper end of this lever is the rod 41 one end of which engages the end of drum shaft 3 and the other end engages the plate 42 which is urged to the left by the coil spring 43 secured to the support 44. With this construction it will be seen that if spring 12 at the left-hand end of the drum is somewhat stronger than spring 43 at the right-hand end the position of the drum may be controlled by the relative energization of the two coils 34 and 35. In the operation of the apparatus therefore, the reproduction of the sound is in accordance with the sum of the light impulses received by the two photo tubes but the drum positioning apparatus operates in response to the difference in the average amount of light received by the two photo tubes.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent in the United States is:

1. Apparatus for reproducing sound from a sound record, comprising means for supporting a sound record member for movement longitudinally of the record thereon, a photoelectric device, optical means for exposing said device to light from a portion of said record member and means responsive to said device for controlling the relative position of said member and said optical means transversely of the record.

2. Apparatus for reproducing sound from a sound record, comprising means for supporting a sound record member for movement longitudinally of the record thereon, a photoelectric device, optical means for exposing said device to light from a portion of said record, sound reproducing means responsive to said device and means responsive to said device for varying the relative position of said member and said optical means transversely of the record.

3. Apparatus for reproducing sound from a sound record, comprising means for supporting a sound record member for movement longitudinally of the record thereon, a plurality of photoelectric devices, optical means for exposing each of said devices to light controlled by one edge of the sound record, and means responsive to the difference in output of said devices for controlling the relative lateral position of the sound record member and the optical means.

4. Apparatus for reproducing sound from a sound record, comprising means for supporting a sound record member for movement longitudinally of the record thereon, a plurality of photoelectric devices, optical means for exposing each of said devices to light controlled by one edge of the sound record, means responsive to the combined effect of said devices for reproducing the recorded sound and means responsive to the differential effect of said devices for controlling the relative lateral position of the sound record member and the optical means.

5. Apparatus for reproducing sound from a sound record comprising means for supporting a sound record member for movement longitudinally of the record thereon, a photoelectric device, optical means exposing said device to light from a portion of said record, means responsive to the output of said device for varying the lateral position of said record member and a sound reproducer connected with said device.

6. Apparatus for reproducing sound from a sound record comprising a drum for supporting a sound record member, a plurality of photoelectric devices, optical means for exposing one of said devices to light from each side of said record, means for amplifying the output of each device, sound reproducing means connected to respond to the combined amplified output of said devices and means responsive to the differential output of said devices for adjusting the position of said drum laterally of the record.

ERNST F. W. ALEXANDERSON.